US005725829A

United States Patent [19]

Miyahara et al.

[11] Patent Number: 5,725,829

[45] Date of Patent: Mar. 10, 1998

[54] METHOD OF FIRING CERAMIC FORMED BODIES

[75] Inventors: Kazuhiro Miyahara, Yokkaichi; Yasuhiro Ito, Aichi Pref., both of Japan

[73] Assignee: NGK Insulators, Ltd., Japan

[21] Appl. No.: 508,699

[22] Filed: Jul. 28, 1995

[30] Foreign Application Priority Data

Sep. 5, 1994 [JP] Japan .................................... 6-211263

[51] Int. Cl.$^6$ .................................................... C04B 33/32

[52] U.S. Cl. ........................... 264/630; 264/656; 264/657

[58] Field of Search ................................ 264/63, 66, 656, 264/657, 630

[56] References Cited

U.S. PATENT DOCUMENTS

| | | | |
|---|---|---|---|
| 2,310,578 | 2/1943 | Fessler et al. | 264/656 |
| 4,404,166 | 9/1983 | Wiech, Jr. | 419/36 |

FOREIGN PATENT DOCUMENTS

| | | |
|---|---|---|
| 0 335 735 | 10/1989 | European Pat. Off. . |
| 0 368 033 | 6/1990 | European Pat. Off. . |
| 0 447 300 | 9/1991 | European Pat. Off. . |
| 1429299 | 5/1966 | France . |
| 1552675 | 1/1969 | France . |
| 862035 | 3/1961 | United Kingdom . |

*Primary Examiner*—Christopher A. Fiorilla
*Attorney, Agent, or Firm*—Parkhurst & Wendel

[57] ABSTRACT

In a method of firing ceramic formed bodies including a binder by using a firing furnace having one or more burners in which a firing output changes alternately between a high output state and a low output state, an air ratio of the burner is maintained at a level of more than 3 in a temperature range from a temperature at which the binder begins to burn out to a temperature at which an ignition loss reaction ends. Further, a firing apparatus has a control means for controlling the burners according to the firing method mentioned above.

5 Claims, 10 Drawing Sheets

PRESENT INVENTION

FIG.6b
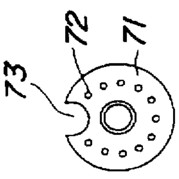
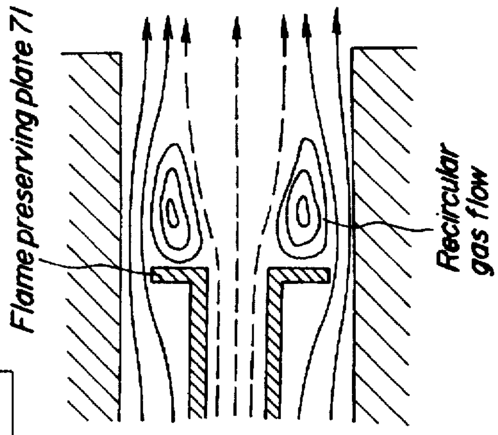
FIG.6c
FIG.6a
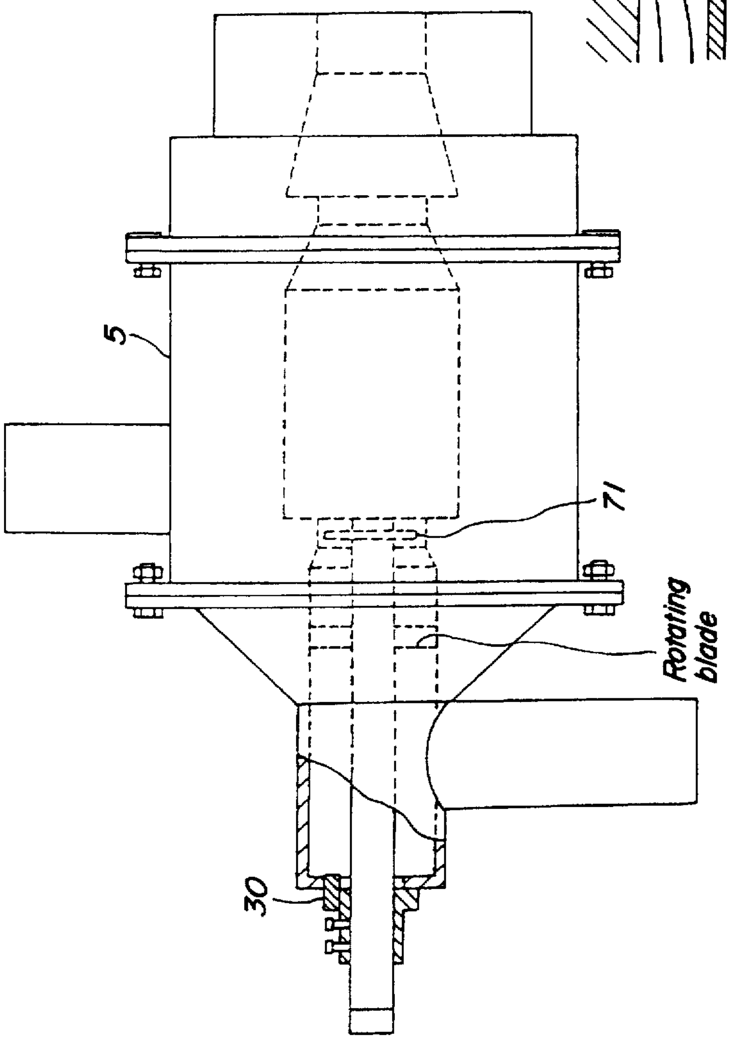

METHOD OF FIRING CERAMIC FORMED BODIES

BACKGROUND OF THE INVENTION (1) Field of the Invention

The present invention relates to a method of firing ceramic formed bodies and a firing apparatus for performing the above firing method therein, which includes a firing furnace having one or more burners in which a firing output alternates between a high output state and a low output state. Hereinafter, such a firing furnace is sometimes referred to as a pulse firing furnace.

(2) Related Art Statement

Usually, according to a proportional firing method, the ceramic formed bodies are fired in a firing furnace having a continuously firing burner. However, such a proportional firing method has drawbacks mentioned below.

(1) In the proportional firing method, when the firing furnace is heated from room temperature to 1500° C. by one capacity of the burner, the burner has a turn-down ratio which is defined by a ratio of a maximum firing capacity of the burner (Kcal/HR) to a minimum firing capacity of the burner (Kcal/HR) in which the burner does not flame out. Due to the turn-down ratio of the burner mentioned above, in the case that the predetermined temperature is low or in the case that a heat ramp rate is slow, a lot of excessive air must be supplied to the firing furnace. Therefore, the firing furnace needs extra fuel. Moreover, even in the case that a lot of excessive air is supplied in the firing furnace, if the required heat ramp rate is slower than the minimum firing capacity of the burner, the firing furnace is overshot with respect to a predetermined temperature.

(2) In the proportional firing method, when the ceramic formed body having a binder such as an organic substance is fired, an oxygen concentration becomes higher due to the excess air mentioned in paragraph (1) above, in a temperature range of firing a binder. Therefore, a binder firing is accelerated at a center portion of the ceramic formed body, and thus a crack is generated due to a temperature difference between the center portion and an outer portion of the ceramic formed body.

(3) In the proportional firing method, since a white smoke with odor is generated in the case of firing the binder, the white smoke is fired by a burner arranged at a flue. However, an amount of the white smoke to be fired increases due to the excessive air mentioned in paragraph (1) above, and thus an amount of fuel needed for firing increases.

(4) In the proportional firing method, in order to eliminate the crack generation mentioned in paragraph (2) above, the heat ramp rate must become extra-ordinarily slow, and thus the firing time becomes extraordinarily long. Therefore, in the proportional firing method, it is difficult to obtain a desired firing heat curve. Moreover, an energy efficiency decreases and the time required to complete firing becomes long, so that a production efficiency is extraordinarily worse.

In order to eliminate the drawbacks mentioned above, it has been proposed to use a firing furnace having one or more burners in which a firing output changes alternately between a high output state and a low output state during firing of the ceramic formed body. Such a firing furnace is widely used in the field of blast furnaces. When using a pulse firing furnace, since the firing operation can be performed in a highly efficient manner, the air ratio is substantially 1, i.e., an excessive air rate is substantially 0%, so that it is expected to solve the problems mentioned above. However, when using a pulse firing furnace, a temperature distribution in the furnace is inferior compared with the known proportional firing method and the firing operation is performed intermittently. Therefore, if the pulse firing method mentioned above is applied to the firing of the ceramic formed body as it is, the following problems occur.

(1) It is difficult to perform an injection molding or an extrusion only by using raw material powders. To solve the problem mentioned above, organic substances are usually added to the raw material powders as a forming agent or a plasticizing agent so as to obtain formability, or natural raw materials including organic substances such as a clay are used, or organic substances are added to the raw material powders as a poring agent. However, in the ceramic formed bodies mentioned above, when the organic substances are fired during the firing operation, a temperature in the furnace is varied abruptly, and a crack is generated in the formed body.

(2) A strength of the formed body is extremely decreased after eliminating the organic substances. In this case, if a temperature applied to the formed body is varied abruptly, a crack is generated in the formed body.

(3) When use is made of a composite material including water of hydrate, halide, carbonate and so on, as ceramic raw materials, a water component, a halogen component and a carbonic acid component are generally eliminated from the ceramic raw materials at temperatures below about 900° C. Removal of these components is generally referred to as ignition loss. A variation of crystal structure is generated due to this ignition loss. In this case, if the variation of crystal structure proceeds to completion, the ceramic formed body has a strength to some extent. However, the temperature of the ceramic body is varied abruptly during the ignition loss mentioned above, and thus a crack or deformation is generated in the formed body.

SUMMARY OF THE INVENTION

It is an object of the invention to eliminate the drawbacks mentioned above and to provide a method of firing ceramic formed bodies and a firing apparatus for performing the firing method, in which a crack or deformation does not occur in the ceramic formed bodies even if they are fired by using a pulse firing furnace.

According to the invention, a method of firing ceramic formed bodies including a binder by using a firing furnace having one or more burners in which a firing output changes alternately between a high output state and a low output state, comprises a step of maintaining an air ratio of said burner to a level of more than 3 in a temperature range beginning at a temperature at which the binder begins to burn out to a temperature at which ignition loss reaction is completed.

Moreover, according to the invention, a firing apparatus for firing ceramic formed bodies, comprises a firing furance, one or more burners arranged in said firing furnace, in which a firing output changes alternately between a high output state and a low output state, and a control means for controlling said burners according to the firing method mentioned above.

In the constitution mentioned above, an air ratio of the burner is maintained to a level of more than 3 in a temperature range beginning at a temperature at which binder begins to burn out to a temperature at which ignition loss reaction is completed. Therefore, if the ceramic formed bodies are fired in the firing furnace in which a firing output changes alternately between a high output state and a low output state, it is possible to make a temperature variation in the temperature range mentioned above gentle, and thus a crack or a deformation is not generated in the ceramic formed body.

Moreover, in a temperature range without the temperature range mentioned above, it is possible to fire the ceramic formed body under such a state that an air ratio is substantially 1 as is the same as a normal pulse firing furnace. Therefore, it is possible to significantly reduce an amount of fuel to be used as compared with the usual proportional firing furnace, and thus it is possible to achieve an energy reduction. In the present invention, an upper limit of an air ratio of the burner is not especially determined in the temperature range beginning at a temperature at which the binder begins to burn out to a temperature at which ignition loss reaction is completed. However, since an air ratio of the burner of the usual proportional firing furnace is about 10, it is preferred to set an upper limit of an air ratio in the temperature range mentioned above to 10 from the viewpoint of energy reduction.

Further, if the burner firing is controlled in such a manner that a high firing time is 1–10 sec. or that a low firing time is 1–10 sec. or that a value (hereinafter, sometimes called as pulse output) such that a time of high output state is divided by a sum of a time of high output state and a time of low output state is set to 30–90%, it is possible to reduce a variation of temperature distributions in the furnace and a variation of properties of the fired bodies especially in the case of firing ceramic honeycomb structural formed bodies. Therefore, it is a preferred embodiment.

BRIEF DESCRIPTION OF THE DRAWINGS

FIGS. 6*a*, 6*b* and 6*c* are schematic views depicting another embodiment of a position of a UV detector with respect to the burner in the embodiment shown in FIG. 2, 3, or 4 respectively;

DESCRIPTION OF THE PREFERRED EMBODIMENTS

Figure 1:
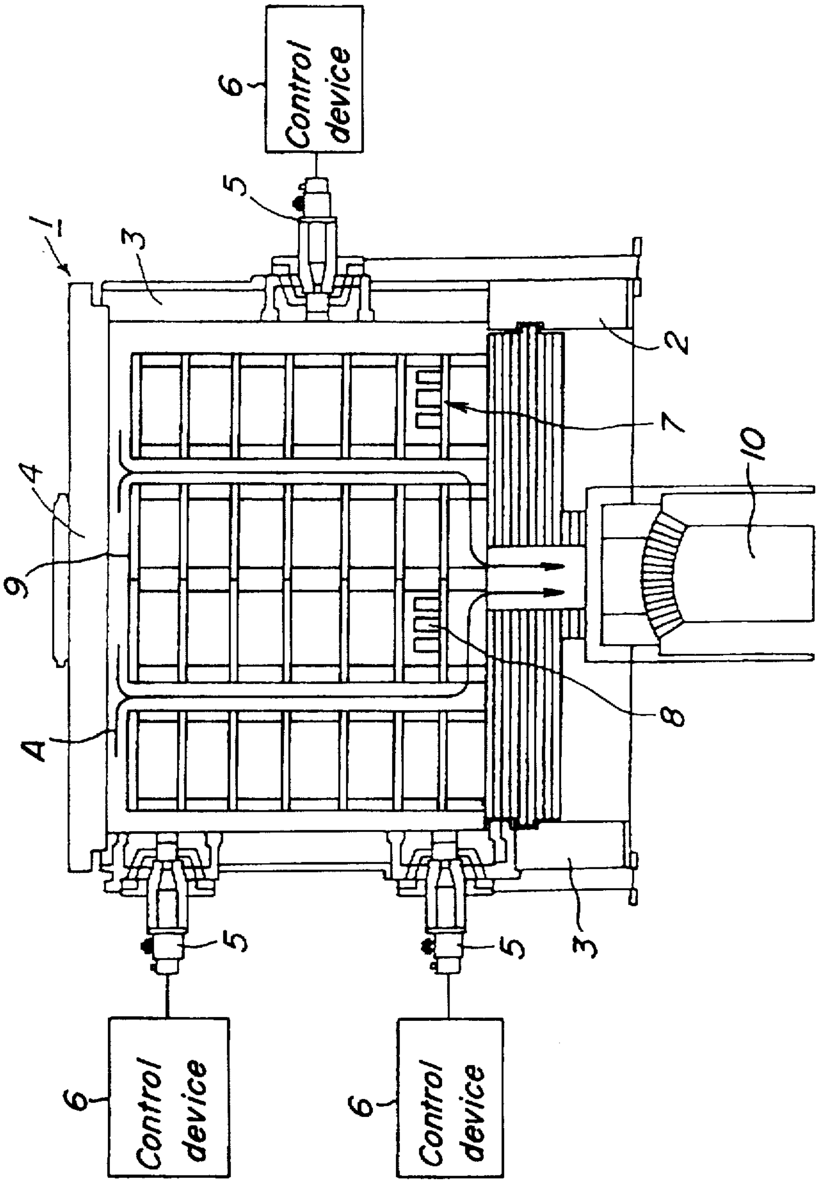
FIG. 1 is a schematic view showing one embodiment of a firing apparatus for performing a method of firing ceramic formed bodies according to the invention.

FIG. 1 is a schematic view showing one embodiment of a firing apparatus for performing a method of firing ceramic formed bodies according to the invention. In this embodiment, a periodic kiln is shown as one embodiment of the firing apparatus. In FIG. 1, a firing apparatus 1 comprises a base 2, side walls 3 and a ceiling 4 defining a closed space (having a door, not shown) arranged on the base 2, one or more burners 5 (in this case, three burners) arranged in the side walls 3, and a control device 6 for controlling a firing state of each of burners 5. In this embodiment, ceramic formed bodies 8 to be fired are arranged on kiln furniture 7 forming a kiln furniture unit 9, and they are fired by using the burners 5. A firing gas necessary for firing supplied from the burners 5 is flowed from an upper portion to a lower portion in the kiln as shown by a firing gas flow A in FIG. 1 due to a drafting pressure of an underground flue 10. The kiln mentioned above is generally called as a down-draft type furnace.

In the present invention, it is important to control each burner 5 by the respective control device 6 in such a manner that a firing output of each burner 5 changes alternately between a high output state and a low output state, so that an air ratio, defined by an amount of air used for firing/an amount of theoretical air, is maintained at substantially 1 in a usual temperature range and is maintained at more than 3 in a temperature range from a temperature of a start of binder burn out to a temperature of an end of an ignition loss reaction, during a firing operation. Moreover, it is preferred to control a firing of the burner 5 by the control device 6 in such a manner that a high firing time during a high output state of the burner 5 is set to 1–10 sec., or that a low firing time during a low output state of the burner 5 is set to 1–10 sec., or that the pulse output is varied in a range of 30–90%.

Figure 2:
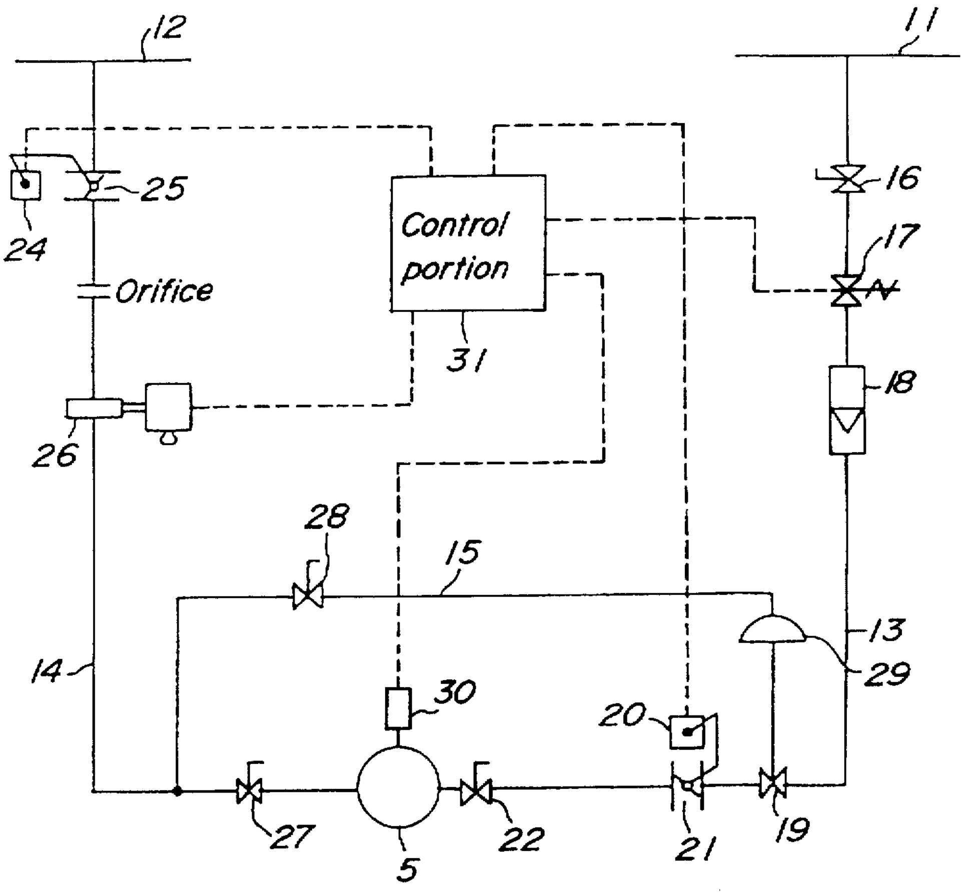
FIG. 2 is a schematic view illustrating one embodiment of a control apparatus of a burner arranged in the firing apparatus according to the invention.
Figure 3:
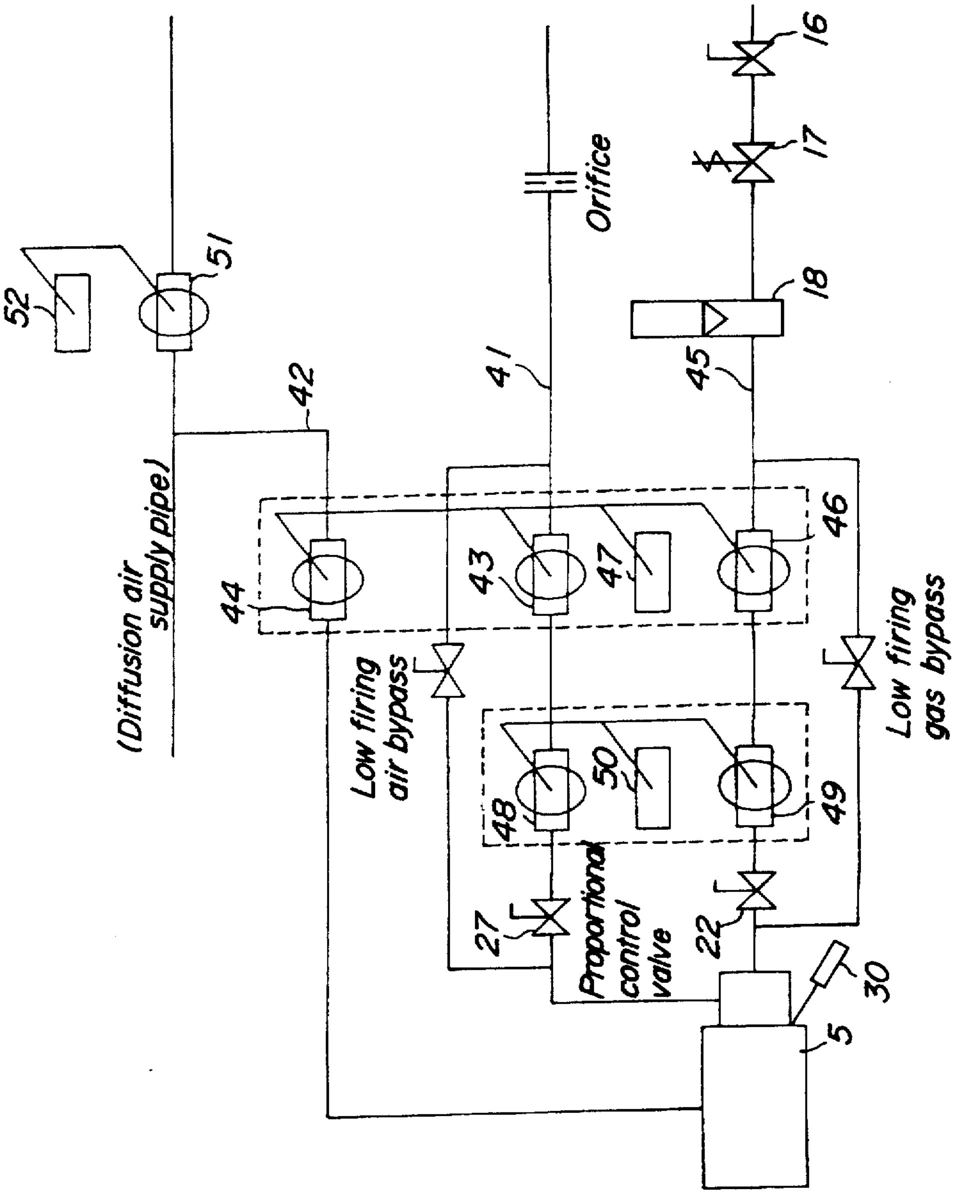
FIG. 3 is a schematic view depicting another embodiment of the control apparatus of the burner arranged in the firing apparatus according to the invention.
Figure 4:
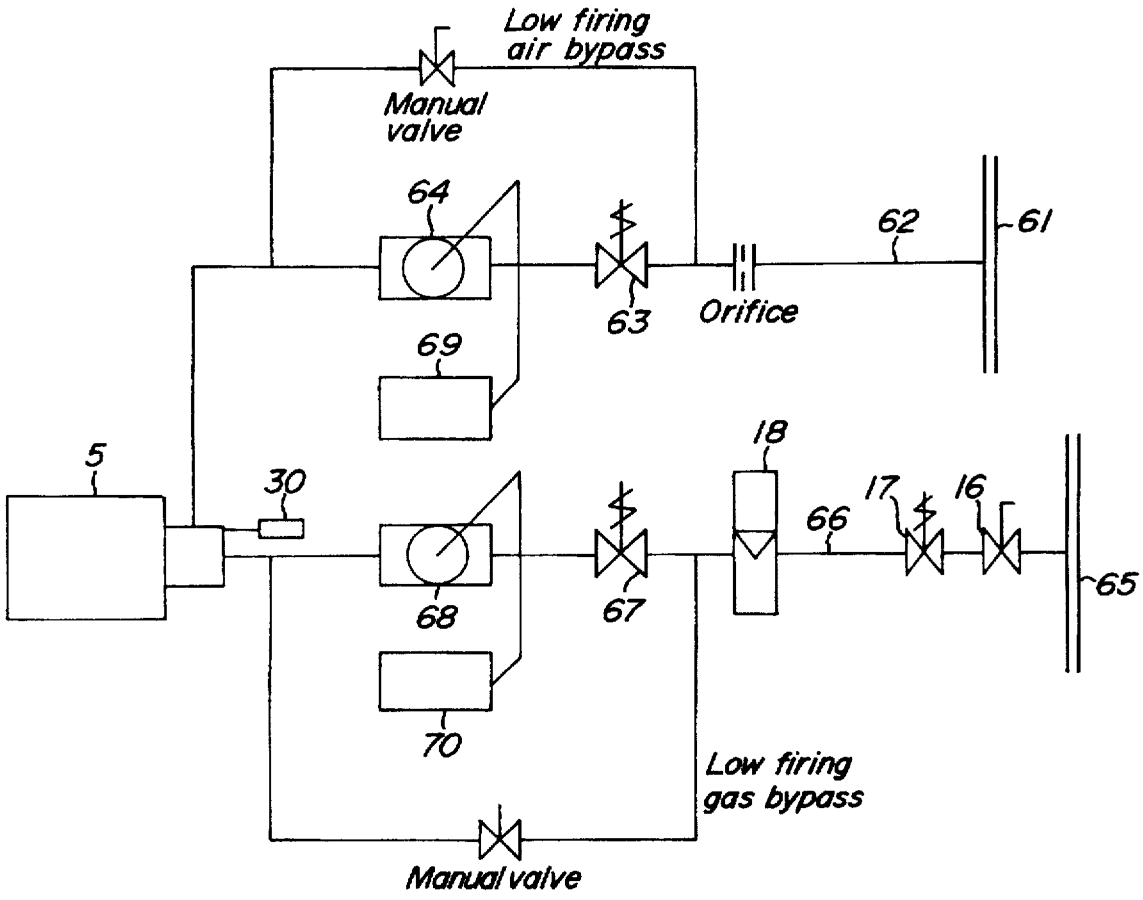
FIG. 4 is a schematic view showing still another embodiment of the control apparatus of the burner arranged in the firing apparatus according to the invention.
Figure 5A:
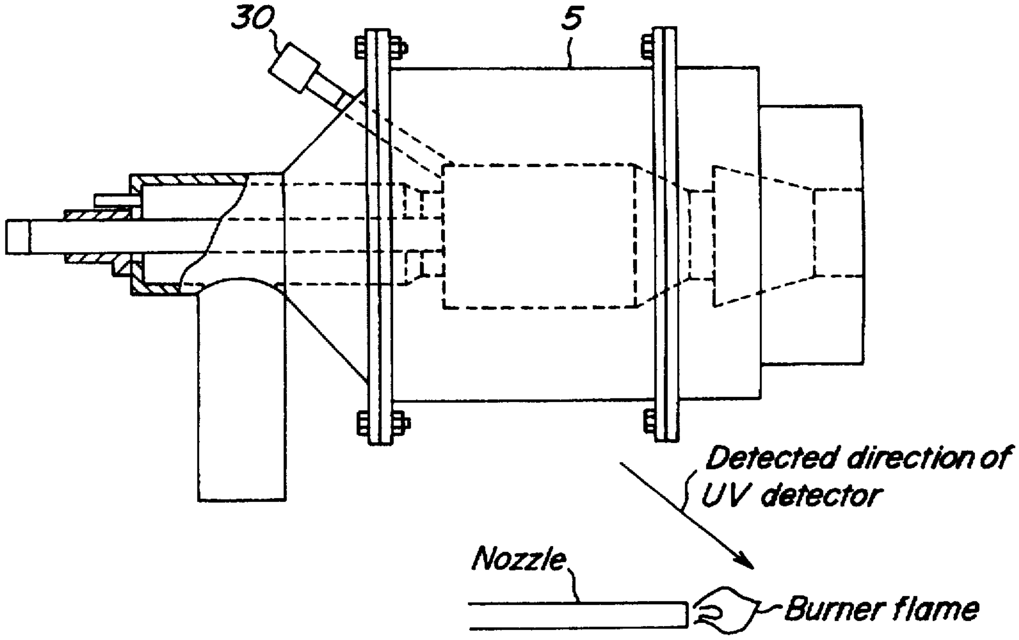
FIG 5a PRIOR ART
FIGS. 5*a* and 5*b* are schematic views illustrating one embodiment of a position of a UV detector with respect to the burner in the embodiment shown in FIG. 2, 3, or 4 respectively.
Figure 5B:
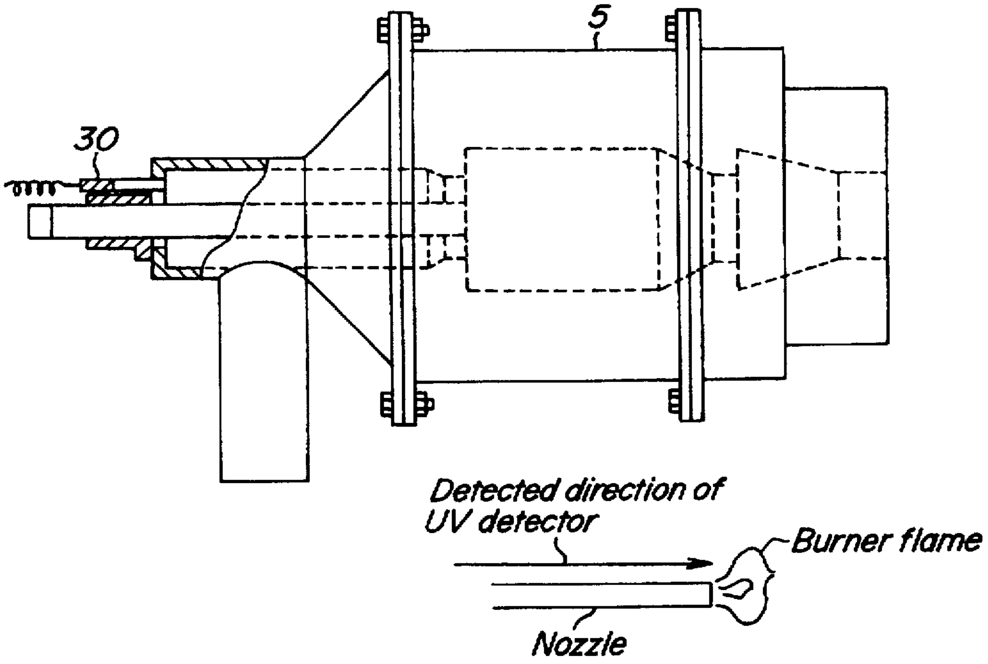

FIG. 2 to FIG. 4 are schematic views respectively showing one embodiment of the control device 6 of the burner 5 arranged in the firing apparatus according to the invention. In the embodiment shown in FIG. 2, a numeral 11 is a main supply pipe for supplying a fuel gas such as LNG and so on, and a numeral 12 is a main supply pipe for supplying air. Moreover, the main supply pipe 11 for a fuel gas supply is connected to the burner 5 via a supply pipe 13, and the main supply pipe 12 for an air supply is connected to the burner 5 via a supply pipe 14. Further, a bypass pipe 15 is arranged between the supply pipe 13 and the supply pipe 14.

In the supply pipe 13, a manual valve 16, a solenoid valve 17, a flowmeter 18, a regulator valve 19, a valve 21 actuated by a control motor 20, and a manual valve 22 are arranged in this order. In the supply pipe 14, a valve 25 actuated by a control motor 24, a pulse control valve 26 and a manual valve 27 are arranged in this order. In the bypass pipe 15, a manual valve 28 and a regulator 29 are arranged. Moreover, a control portion 31 is arranged for controlling the solenoid valve 17, the pulse control valve 26, the control motors 20, 24 and a UV detector 30 for detecting a flame out of the burner 5.

In the embodiment mentioned above, the pulse control valve 26 performs an OPEN/CLOSE operation under a control of the control portion 31, so that a pressure in the supply pipe 14 alternately changes between a high state and a low state. This pressure variation in the supply pipe 14 is transmitted to the regulator 29 via the bypass pipe 15, and thus the regulator valve 19 performs an OPEN/CLOSE operation in such a manner that, if the pulse control valve 26 is opened, the regulator valve 19 is opened. Therefore, if the pulse control valve 26 is opened, an air and a firing gas are supplied to the burners 5 simultaneously. The flowmeter 18 detects an amount of supplied fuel gas, and is used for making an amount of fuel gas supplied to the burner 5 and an air ratio both to predetermined values.

In the embodiment mentioned above, in the case that the pulse control valve 26 is closed (i.e., the regulator valve 19 is closed), the burner firing does not stop completely, but a small firing due to a small flame can be maintained by a little amount of air and gas leaked from a gap between the pipe and the pulse control valve 26 (or the regulator valve 19). In this case, if no gap is arranged therebetween and inlets and outlets of respective valves are connected by the bypass pipes, the small firing may be maintained. The control motor 20 controls an amount of fuel gas to be supplied by means of the valve 21. The control motor 24 controls an amount of air for firing to be supplied by means of the valve 25. The manual valves 16, 22, 27 and 28 are used for slightly controlling an amount of fuel gas or the like flowing through respective pipes. The solenoid valve 23 stops a flow of fuel gas to the burner 5 when the UV detector 30 detects a flame out of the burner 5.

In the embodiment shown in FIG. 3, air for firing is supplied to the burner 5 via a combustion air supply pipe 41 and a diffusion air supply pipe 42 and a fuel gas is supplied to the burner 5 via a fuel gas supply pipe 45. In the combustion air supply pipe 41, an orifice and the manual valve 27 are arranged. In the fuel gas supply pipe 45, the manual valves 16, 22, the solenoid valve 17 and a flowmeter 18 are arranged. Moreover, the UV detector 30 is arranged by the burner 5.

Moreover, OPEN/CLOSE operations of a valve 43 arranged in the combustion air supply pipe 41, a valve 44 arranged in the diffusion air supply pipe 42 and a valve 46 arranged in the fuel gas supply pipe 45 are performed simultaneously by a control motor 47, so that a firing output of the burner 5 alternates between a high output state and a low output state. Moreover, control of air for firing and an air ratio of a fuel gas are performed by supplying a predetermined amount of air, an air ratio of which is substantially 1, via the combustion air supply pipe 41, controlling OPEN/CLOSE operations of a valve 48 arranged in the combustion air supply pipe 41 and a valve 49 arranged in the fuel gas supply pipe 45 by means of a control motor 50, and controlling OPEN/CLOSE operation of a valve 51 arranged in the diffusion air supply pipe 42 by means of a control motor 52. The reason for supplying air for firing via both of the combustion air supply pipe 41 and the diffusion air supply pipe 42 is to prevent a flame out of the burner 5.

In the embodiment shown in FIG. 4, an air supply pipe 61 is connected to the burner 5 via a supply pipe 62, and an orifice, a pulse control valve 63 and a valve 64 are arranged in the supply pipe 62. Moreover, a fuel gas supply pipe 65 is connected to the burner 5 via a supply pipe 66, and the manual valve 16, the solenoid valve 17, the flowmeter 18, a pulse control valve 67 and a valve 68 are arranged in the supply pipe 66. Then, OPEN/CLOSE operations of the pulse control valves 63 and 67 are performed simultaneously by means of a control device not shown, so that a firing output of the burner 5 alternates between a high output state and a low output state. Moreover, control of air for firing and an air ratio of fuel gas are performed by controlling OPEN/CLOSE operations of the valve 64 and the valve 68 by means of the control motors 69, 70. Further, the low firing air bypass, the low firing gas bypass and the UV detector 30 are also arranged.

FIGS. 5*a* and 5*b* and FIGS. 6*a*, 6*b* and 6*c* are schematic views showing one embodiment of a detected direction of UV detector with respect to the burner in the embodiment shown in FIG. 2, 3 or 4 respectively. In the low firing time of the firing method using the pulse firing furnace, since a flame in the burner 5 is very small and unstable due to an extending or a shrinking of the flame length, the UV detector 30 of the embodiment shown in FIG. 5*a* does not detect a flame out accurately due to the assembling position thereof. Therefore, it is preferred to assemble the UV detector 30 at positions shown in FIG. 5*b* and FIGS. 6*a*, 6*b* and 6*c* in which the UV detector 30 can observe the flame parallel to a flow thereof. Moreover, in the burner 5 shown in 6*a* having a rotating blade and a gas cylindrical tube, it is preferred to arrange an observation hole 73 for the UV detector 30 in a flame preserving plate 71 having flame holes 72, as shown in FIG. 6*b*. In the embodiment shown in FIGS. 6*a*, 6*b* and 6*c*, the flame preserving plate 71 is arranged in an air supply cylinder of the burner, and thus a recircular gas flow can be generated near the flame preserving plate 71 as shown in FIG. 6*a*. In this case, if a fuel gas is supplied from a center of the flame preserving plate 71, a part of the fuel gas is mixed into the recircular gas flow and a suitable mixing state of the fuel gas can be performed, so that a stable flame can be obtained. In this manner, this fuel gas recirculation can maintain the main flame of the burner.

Hereinafter, actual examples will be explained.

EXAMPLE 1

Figure 7:
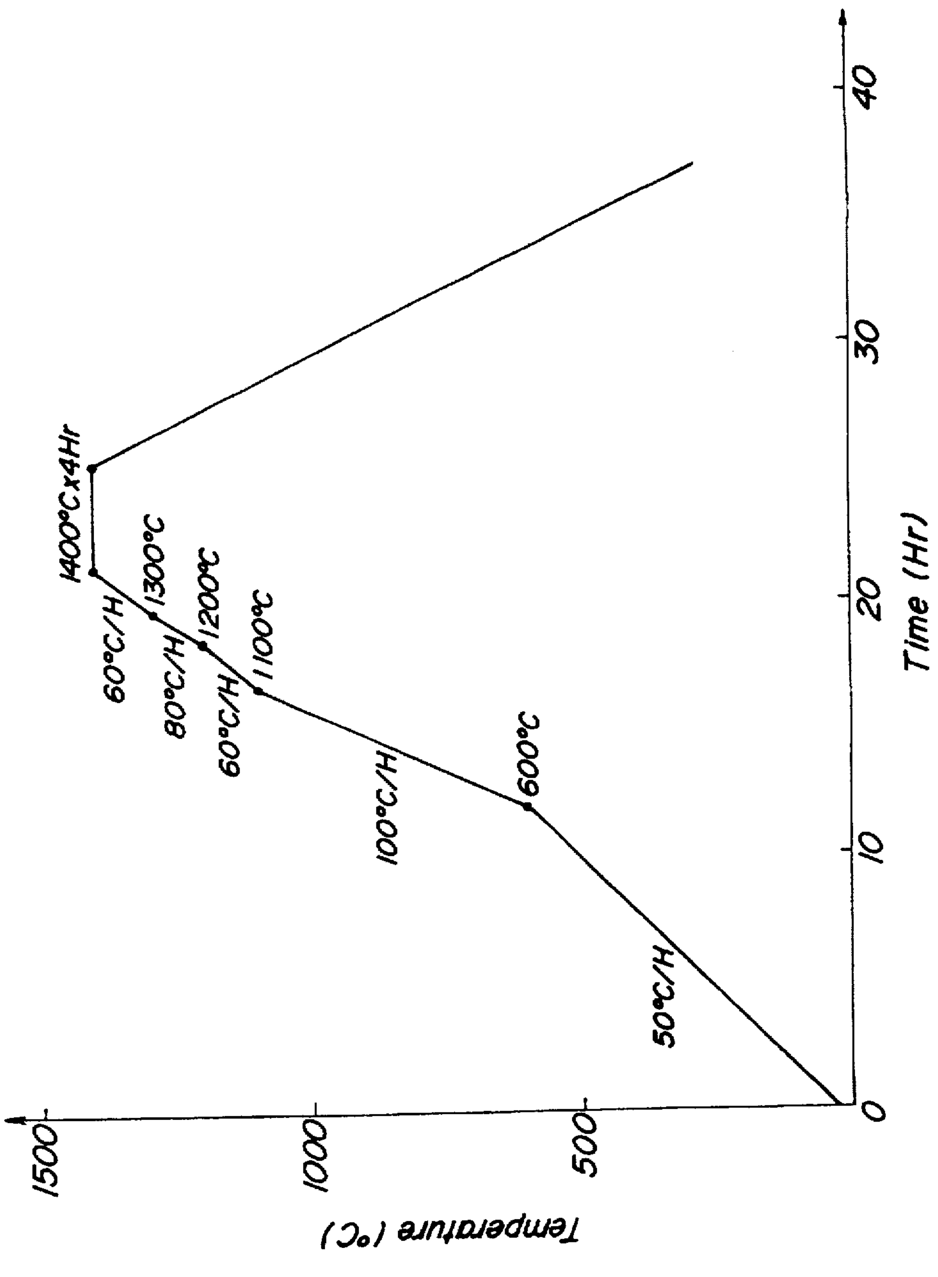
FIG. 7 is a graph showing one firing schedule of the present invention.

Talc, kaolin, alumina and the other raw materials for cordierite generation were prepared and mixed to obtain a mixture. Then, water and organic substances as a forming agent and/or a poring agent were added in the mixture for plasticizing it to obtain a formable batch. Then, the batch was extruded and dried to obtain honeycomb formed bodies. After that, the thus obtained honeycomb formed bodies were fired according to a firing schedule shown in FIG. 7 by using a periodic kiln having a construction shown in FIG. 1 to obtain cordierite honeycomb structural bodies according to the present invention and comparative examples. Moreover, the honeycomb formed bodies were fired according to the same firing schedule shown in FIG. 7 by using a proportional firing furnace to obtain honeycomb structural bodies according to conventional examples.

In the firing operation, an air ratio was varied at 150° C. at which binders start to fire, and at 600° C. at which a dehydration reaction of kaolin is finished, as shown in the following Table 1. Moreover, in the firing operation by using the burner whose firing output changes alternately between a high output state and a low output state according to the present invention and the comparative examples, the firing output was controlled in such a manner that a value (pulse output) obtained by dividing a time of high output state by a sum of a time of high output state and a time of low output state is set to 30–90% and that both of the high firing time and the low firing time are within a range of 1–10 sec.

With respect to the honeycomb structural bodies according to the present invention, the comparative example and the conventional example, a generation rate of longitudinal cracks, a generation rate of end surface cracks, a reduction rate of fuel gas to be used and a reduction rate of electricity to be used both with respect to the conventional example were measured. The measuring results are shown in the following Table 1.

TABLE 1

| | Sample No. | Air ratio less than 150° C. | Air ratio 150~ 600° C. | Air ratio 600° C.~end of highest temperature keep | Generation rate of longitudinal crack (%) | Generation rate of crack on end surface (%) | Reduction rate of gas (%) | Reduction rate of electricity (%) |
|---|---|---|---|---|---|---|---|---|
| Present invention | 1 | 3.0 | 3.0 | 1.1~3.0 | 5 | 2 | 44 | 38 |
| | 2 | 4.0 | 3.0~4.0 | 1.1~3.0 | 3 | 1 | 40 | 35 |
| | 3 | 6.0 | 3.0~6.0 | 1.1~3.0 | 2 | 0 | 37 | 31 |
| | 4 | 8.0 | 3.0~8.0 | 1.1~3.0 | 1 | 0 | 34 | 29 |
| | 5 | 10.0 | 3.0~10.0 | 1.1~3.0 | 0 | 0 | 30 | 26 |
| | 6 | 11.0 | 3.0~11.0 | 1.1~3.0 | 0 | 0 | 27 | 22 |
| Comparative example | 7 | 1.2 | 1.2 | 1.1~1.2 | 52 | 51 | 62 | 54 |
| | 8 | 2.0 | 2.0 | 1.1~2.0 | 23 | 19 | 50 | 43 |
| | 9 | 2.5 | 2.5 | 1.1~2.5 | 14 | 9 | 48 | 40 |
| Conventional example | | 13.0~14.0 | 4.0~13.0 | 1.1~4.0 | 0 | 6 | — | — |

From the results shown in Table 1, it is understood that the examples according to the present invention can reduce extremely an amount of fuel gas to be used and an amount of electricity to be used as compared with the conventional examples, while they have the same properties as those of the conventional examples. Moreover, the examples according to the present invention, in which an air ratio in a temperature range from a temperature at which binders begin to burn out (150° C.) to a temperature of ignition loss finish (600° C.) is set to more than 3, show excellent properties with respect to the generation rate of longitudinal cracks and so on, as compared with the comparative examples in which an air ratio in the temperature range mentioned above is not more than 3. Moreover, since an air ratio of the present invention is low as compared with the conventional proportional firing method, an oxygen concentration can be lowered in a binder firing range, and thus a binder firing in a center portion of the honeycomb formed body can be reduced. Therefore, if a heat ramp rate in the binder firing range is made faster than that of the proportional firing method, it is possible to obtain the same crack generation rate as that of the proportional firing method.

Next, examples in which the present invention is applied to insulators and electric parts will be explained.

EXAMPLE 2

(a) Insulators

Figure 8:
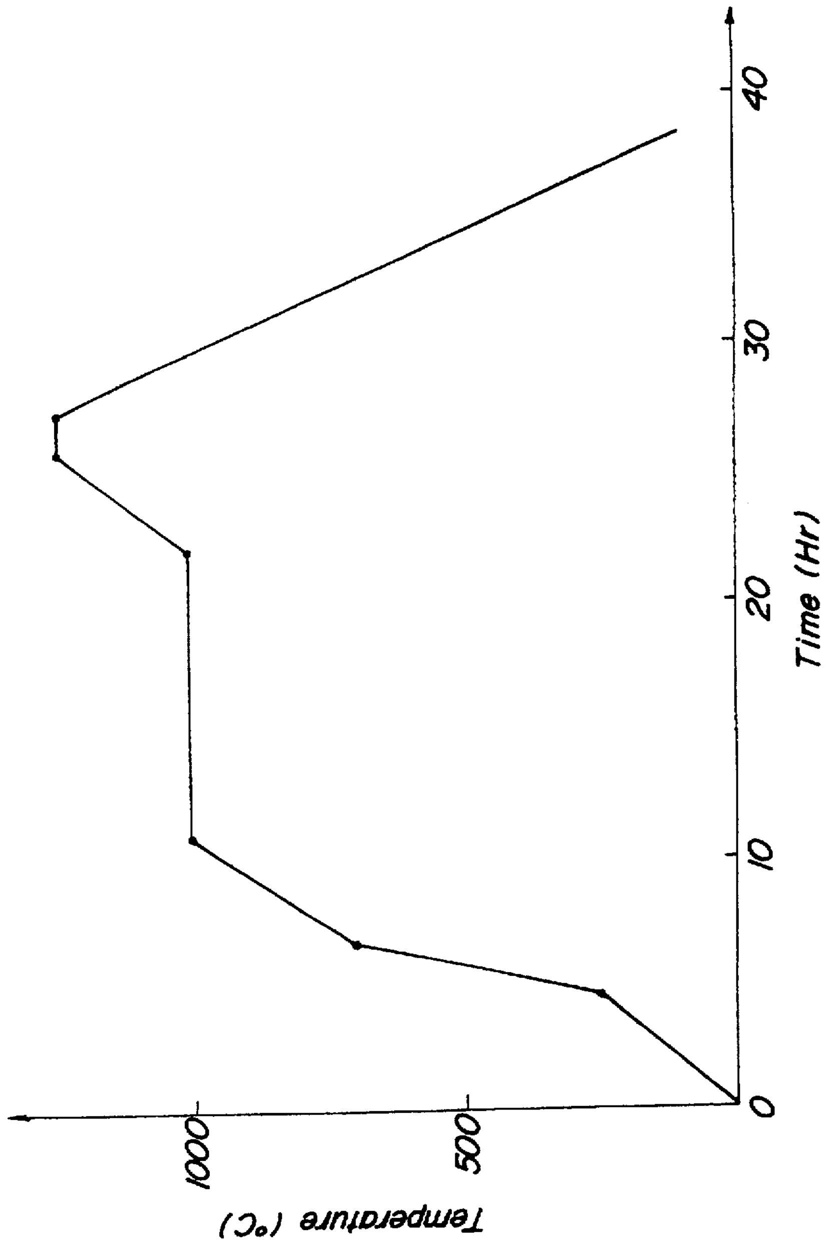
FIG. 8 is a graph illustrating another firing schedule of the present inventions.

Raw materials consisting of porcelain stone: 40 wt %, feldspar: 30 wt % and kaolin: 30 wt % were ground in a wet state and were dewatered to form a cake. Then, the cake was pugged and the pugged cake is subjected to a pull-down forming. After that, the thus formed body was dried and fired according to a heat curve shown in FIG. 8 as is the same as the example 1. In a temperature range of 550°–750° C. during the firing, a crystal water in the raw materials was dehydrated and a temperature difference between an inner portion and an outer portion of the formed body becomes larger. Moreover, a clay component in the formed body was abruptly shrunk. The temperature range mentioned above corresponds to that of the example 1 from a temperature at which binders begin to burn out to a temperature at which the ignition loss reaction ceases. Crack generation rates of the examples obtained by using the pulse firing method in which an air ratio is varied and the examples obtained by using the proportional firing method as is the same as the example 1 will be shown in the following Table 2.

TABLE 2

| | Pulse firing method | | | | Proportional firing method |
|---|---|---|---|---|---|
| Air ratio at 550~750° C. | 1.2 | 2.5 | 3.0 | 3.3~4.0 | — |
| Generation rate of crack (%) | 52 | 15 | 3 | 0 | 0 |

From the results shown in Table 2, it is understood that the examples of the present invention, in which an air ratio in a range of 550°–750° C. is set to more than 3, can obtain substantially the same crack generation rate as that of the conventional examples using the proportional firing method. Moreover, in a reducing flame firing used in the firing of the insulators, since an amount of firing gas is small even in the case of using the conventional proportional firing method, it is difficult to improve a temperature distribution in the furnace. However, according to the present invention, it is possible to improve a temperature distribution in the furnace, since use is made of the pulse firing method in which an amount of firing gas can be increased sufficiently as compared with the proportional firing method and the pulse output is set to 30–90%.

(b) electric parts

Electric parts such as a ceramic substrate for electric devices, a ceramic package for integrated circuits, a multi-layer ceramic package, a multi-layer ceramic circuit substrate, a ceramic capacitor and so on are formed into a tape by using a doctor blade process, a calender process and so on. In this tape forming process, use is made of a slurry obtained by adding a binder and/or a plasticizer, and a solvent in ceramic raw materials. As for the binder, use is made of cellulose acetate, polyacrylate, polymethacrylate, polyvinyl alcohol, polyvinyl butyral and so on. As for the plasticizer, use is made of sucrose acetate isobutylate, glycerin, dibutyl phthalate, and so on.

Then, ceramic tapes including the same binders and so on were prepared, and the thus prepared ceramic tapes were fired in such a manner that an air ratio is varied in a temperature range of 100°–600° C. from a temperature of the binder firing start to a temperature of the ignition loss reaction finish as is the same as the example 1. After that, crack generation rates of the thus fired bodies were measured. The results are shown in the following Table 3.

TABLE 3

| | Pulse firing method | | | | Proportional firing method |
|---|---|---|---|---|---|
| Air ratio at 100~600° C. | 1.2 | 2.5 | 3.0~5.0 | 3.0~8.0 | — |
| Generation rate of crack (%) | 82 | 35 | 3 | 0 | 0 |

From the results shown in Table 3, it is understood that the examples according to the present invention in which an air ratio in a temperature range of 100°–600° C. is set to more than 3 show substantially the same excellent crack generation rates as that of the conventional proportional firing method, but that the comparative examples in which an air ratio in the temperature range mentioned above is set to not more than 3 show worse crack generation rates.

Below, preferred embodiments will be explained.

EXAMPLE 3

By varying the pulse output, the high firing time of the high output state, and the low firing time of the low output state during the firing with respect to the same formed bodies as the example 1, preferred ranges of them were measured. In the following Table 4 showing the results, the pulse output was measured by sampling 24 points in the periodic kiln having the construction shown in FIG. 1 by means of thermocouples. Moreover, in this case, a predetermined temperature is 200° C. In the following Table 5 showing the high firing time and in the following Table 6 showing the low firing time, a variation range of temperatures on the formed body to be fired was measured. The results are shown respectively in Tables 4, 5 and 6.

TABLE 4

| | Pulse firing method | | | | | | Proportional firing method |
|---|---|---|---|---|---|---|---|
| Pulse output (%) | 25 | 30 | 50 | 70 | 90 | 95 | — |
| Air ratio | 3.0 | 3.0 | 3.0 | 3.0 | 3.0 | 3.0 | 11.5 |
| Highest temperature~lowest temperature among 24 points in furnace (°C.) | 60 | 30 | 25 | 20 | 15 | 15 | 20 |
| Gas using quantity with respect to proportional firing method | −50 | −43 | −26 | −17 | −5 | −2 | — |

TABLE 5

| | | | | | | |
|---|---|---|---|---|---|---|
| High firing time (sec.) | 15 | 12 | 10 | 6 | 3 | 1 |
| Low firing time (sec.) | 10 | 10 | 10 | 10 | 10 | 10 |
| Air ratiO | 3 | 3 | 3 | 3 | 3 | 3 |
| Variation of surface temperature (°C.) | 20 | 18 | 12 | 9 | 7 | 5 |

TABLE 6

| | | | | | | |
|---|---|---|---|---|---|---|
| Low firing time (sec.) | 15 | 12 | 10 | 6 | 3 | 1 |
| High firing time (sec.) | 10 | 10 | 10 | 19 | 10 | 10 |
| Air ratio | 3 | 3 | 3 | 3 | 3 | 3 |
| Variation of surface temperature (°C.) | 20 | 17 | 11 | 9 | 7 | 4 |

From the results mentioned above, as for the pulse output obtained by dividing the high output time by a sum of the high output time and the low output time, it is understood that, if the pulse output is set to 30–90%, an amount of fuel gas to be used can be largely reduced while the temperature variation range can be maintained as is the same as the conventional example. Therefore, it is preferred to set the pulse output to 30–90%. Moreover, as for the high firing time and the low firing time, if they are set to 1–10 sec., the temperature variation range can be made small. Therefore, it is preferred to set them to 1–10 sec.

Further, embodiments to which the present invention can be preferably applied will be explained.

EXAMPLE 4

As for an effect of an outer partition, an applicable temperature range of the pulse firing method, a timing of the high firing state and a method of controlling a pressure in the furnace, with respect to the same formed bodies as the example 1, the embodiments to which the present invention can be preferably applied were measured.

(1) Effects of outer partitions

Figure 9:
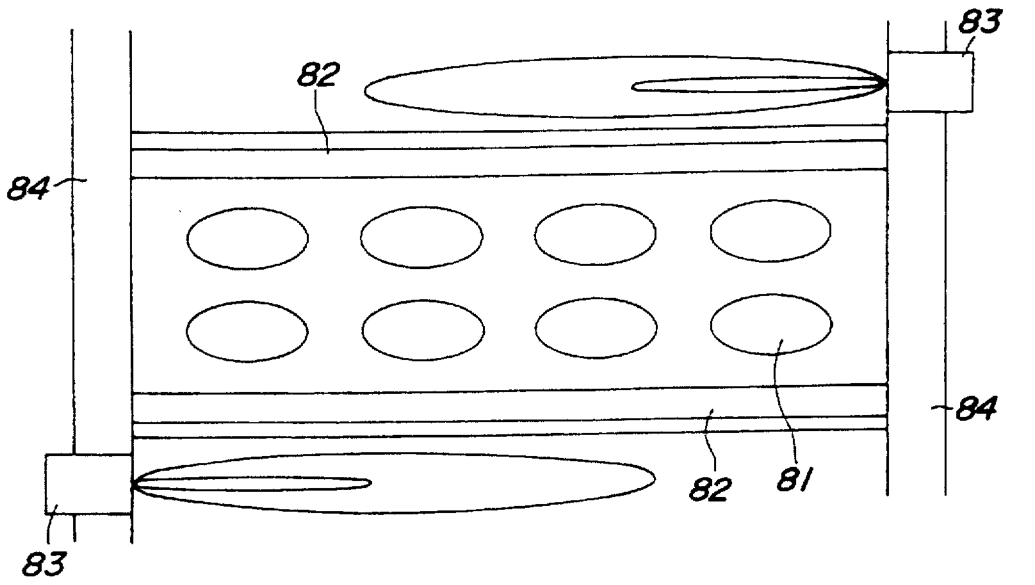
FIG. 9 is a schematic view depicting one outer partition of the present invention.

As shown in FIG. 9, outer partitions 82 made of mullite or alumina having substantially the same or greater height as that of honeycomb formed bodies 81 were arranged between side walls 84 to which burners 83 are arranged. Then, the pulse firing method according to the invention was performed. As a result, as shown in the following Table 7, it is possible to reduce the crack generation rates.

TABLE 7

| | | |
|---|---|---|
| Air ratio at 150~600° C. | 3.0 | 3.0 |
| Outer partition | not-using | using |
| Generation rate of longitudinal crack (%) | 5 | 1 |
| Generation rate of crack on end surface (%) | 1 | 0 |

(2) Applicable temperature range of the pulse firing method

Recently, honeycomb structural bodies having a rib thickness such as 4 mil which is thinner than a normal rib thickness such as 6 mil have been developed. Here, the rib means a wall forming through-holes of the honeycomb structural body. In the honeycomb structural bodies having the thin rib, since a strength of the honeycomb formed body to be fired is weak from the binder burning finish to a crystallization, cracks are liable to be generated as compared with the normal one. Therefore, the crack generation rates were compared with respect to the following cases (A) and (B). In the case (A), the applicable temperature range of the pulse firing method is limited to a range from a room temperature to 350° C. at which the binder burning is finished, and, after 350° C., the proportional firing method is performed. In the case (B), the pulse firing method is performed from a room temperature to a highest temperature. The results are shown in the following Table 8.

TABLE 8

| Firing method | A | B |
|---|---|---|
| Generation rate of longitudinal crack (%) | 2 | 16 |
| Generation rate of crack on end surface (%) | 1 | 11 |

From the results shown in Table 8, it is understood that the case (A) in which the firing is performed firstly by the pulse firing method and then by the proportional firing method can reduce the crack generation rates as compared with the case (B) in which only the pulse firing method is performed. In this case, a firing changing operation from the pulse firing method to the proportional firing method can be performed by the apparatus shown in FIGS. 2 to 4. In the case that the firing changing operation from the pulse firing method to the proportional firing method is performed, if the pulse output is abruptly increased to 100%, a temperature and a pressure in the kiln are abruptly varied. Therefore, it is preferred to increase the pulse output to 100% by an ascending rate of 100 sec./pulse output of 1%, and the firing output is decreased correspondingly. In this case, it is possible to prevent abrupt variations of a temperature and a pressure in the kiln.

(3) Timing of the high firing state

Figure 10:
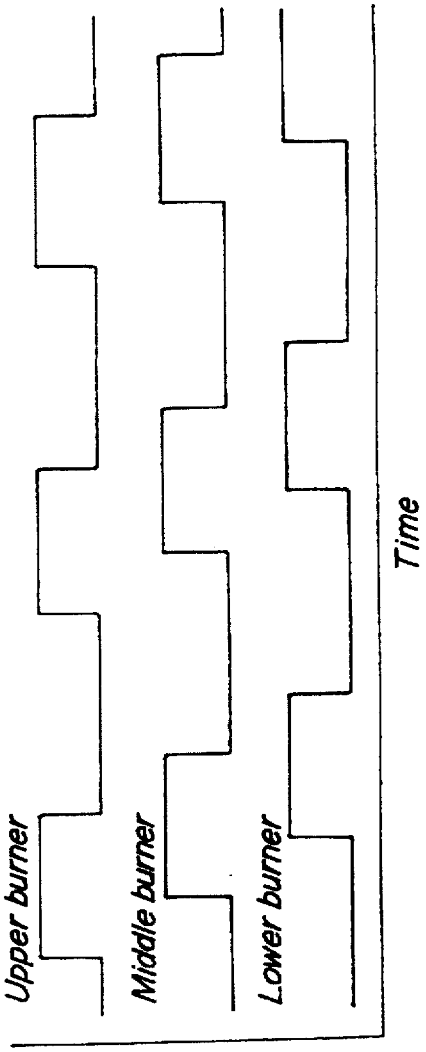
FIG. 10 is a graph showing firing timing of the present invention.

As shown in FIG. 1, three burners 5 arranged on the same plane is assumed to be one zone, and an air circulation in the kiln was performed by controlling the high firing states of three burners 5 as shown in FIG. 10. In this case, it is possible to improve a temperature distribution in the kiln.

(4) Method of controlling a pressure in the kiln (furnace pressure)

In the pulse firing method, since an amount of air supplied into the kiln from the burner is largely varied corresponding to a lapse of time, the furnace pressure is largely varied. If the furnace pressure becomes negative, a cool air is supplied into the kiln, and a temperature distribution becomes worse. Therefore, the furnace pressure was set in such a manner that a lower limit of a furnace pressure variation becomes positive, and also a revolution of an exhaust fan and an opening rate of an exhaust damper were controlled in the same manner. In this case, in order to control the furnace pressure by overaging inputs of a furnace pressure oscillator, a primary delay processing device (10–40 sec.) was arranged. The primary delay processing device functions to permit the furnace pressure variation in a short time due to a pulse cycle and to control the resolution of the exhaust fan and the opening rate of the exhaust damper directly corresponding to the furnace pressure variation due to an amount of an exhaust gas. As a result, if the furnace pressure is abruptly varied, the revolution of the exhaust fan and the opening rate of the exhaust damper are not varied abruptly, and thus it is possible to prevent an abrupt variation of the furnace pressure.

In the embodiments mentioned above, the explanations are made with respect to the periodic kiln, but the firing method according to the invention can be preferably applied to other kilns such as a tunnel kiln. In the tunnel kiln, if the firing method according to the invention is applied to the burners for burning binders in a low temperature, it is possible to decrease an oxygen concentration and to reduce a crack generation rate of the fired body. Moreover, if a heat ramp rate in this temperature range is made faster, a crack generation rate can be maintained to the same level as that of the conventional example.

Further, in the example mentioned above, the explanations are made to a cordierite composition, but the same results can be obtained if the firing method according to the invention is applied to the other ceramic compositions. Moreover, in the case that use is made of the firing furnace having one or more burners in which a firing output changes in a high output state and in a low output state alternately, it is preferred to keep a variation time from one of the high output state and the low output state to the other to more than 0.5 sec. so as to prevent a flame out of the burner.

As clearly understood from the above explanations, according to the invention, since an air ratio of a burner is maintained more than 3 in a temperature range from a temperature at which binder burn out begins to a temperature of an end of an ignition loss reaction, a temperature variation can be made gentle in this temperature range if a ceramic formed body is fired in the firing furnace having one or more burners in which a firing output changes in a high output state and in a low output state alternately, and thus it is possible to prevent a crack generation in a firing of a ceramic formed body.

What is claimed is:

1. A method of firing ceramic formed bodies including a binder by using a firing furnace having at least one burner in which a firing output changes alternately between a first output state and a second output state that is lower than said first output state, comprising a step of maintaining an air ratio of said at least one burner to a level of more than 3 in a temperature range from a temperature at which the binder begins to burn-out to a temperature at which an ignition loss reaction ends.

2. The method of firing ceramic formed bodies according to claim 1, wherein a firing time of said first output state of said burner is 1~10 sec.

3. The method of firing ceramic formed bodies according to claim 1, wherein a firing time of said output state of said burner is 1~10 sec.

4. The method of firing ceramic formed bodies according to claim 1, wherein said ceramic formed bodies comprise honeycomb structural bodies.

5. The method of firing ceramic formed bodies according to claim 1, wherein a pulse output value is 30–90%, said pulse output value being obtained by dividing a time of the first output state by a sum of the time of the first output state and a time of the second output state.

* * * * *